(12) United States Patent
Tigges

(10) Patent No.: US 8,967,182 B2
(45) Date of Patent: Mar. 3, 2015

(54) TIRE VALVE

(75) Inventor: Bertram Tigges, Cologne (DE)

(73) Assignee: PTG Reifendruckregelsysteme GmbH, Neuss (DE)

( * ) Notice: Subject to any disclaimer, the term of this patent is extended or adjusted under 35 U.S.C. 154(b) by 33 days.

(21) Appl. No.: 13/581,256

(22) PCT Filed: Feb. 16, 2011

(86) PCT No.: PCT/EP2011/052262
§ 371 (c)(1),
(2), (4) Date: Oct. 31, 2012

(87) PCT Pub. No.: WO2011/104148
PCT Pub. Date: Sep. 1, 2011

(65) Prior Publication Data
US 2013/0061945 A1 Mar. 14, 2013

(30) Foreign Application Priority Data
Feb. 24, 2010 (DE) .................... 20 2010 000 254 U

(51) Int. Cl.
*F16K 15/20* (2006.01)
*B60C 29/00* (2006.01)

(52) U.S. Cl.
CPC ............... *F16K 15/20* (2013.01); *B60C 29/005* (2013.01)
USPC ...................................... 137/223; 251/149.6

(58) Field of Classification Search
USPC ................... 137/223, 232; 251/149.1, 149.6; 152/427, 428, 429
See application file for complete search history.

(56) References Cited

U.S. PATENT DOCUMENTS

| | | | | | |
|---|---|---|---|---|---|
| 1,865,231 | A | * | 6/1932 | Buck | 137/223 |
| 1,969,225 | A | * | 8/1934 | Lear | 137/223 |
| 2,095,912 | A | * | 10/1937 | Jackson | 137/223 |
| 2,128,623 | A | * | 8/1938 | Stuck | 137/223 |
| 2,361,890 | A | * | 10/1944 | Watson | 137/223 |
| 2,854,020 | A | * | 9/1958 | Williams | 137/232 |
| 3,180,349 | A | * | 4/1965 | Steer et al. | 137/223 |
| 4,072,048 | A | * | 2/1978 | Arvan | 73/146.8 |

(Continued)

FOREIGN PATENT DOCUMENTS

| | | |
|---|---|---|
| DE | 20200612729 | 12/2007 |
| EP | 1182061 | 2/2002 |
| WO | 99/37492 | 7/1999 |

OTHER PUBLICATIONS http://www.merriam-webster.com/dictionary/contour. Feb. 12, 2013.*

(Continued)

*Primary Examiner* — John Rivell
*Assistant Examiner* — R. K. Arundale
(74) *Attorney, Agent, or Firm* — Margaret Polson; Polson & Associates, PC

(57) ABSTRACT

A tire valve (1) having a valve channel (11) with a valve body (10) enclosing a valve seat (15), having at least one connecting piece (9) for connecting the valve body (10) to a valve base (2) is disclosed. The valve body (10) has a valve part (12) inserted in the valve channel (11) and displaceable in the axial direction therein, sealingly bearing against the valve seat (15) of the valve body (10) in the closed position of valve (1). The connecting piece (9) of the valve body (10) is placed in a connecting segment (8) at a distance in the axial direction from the functional valve segment of the valve body (10), and the valve body (10) is implemented as a single piece.

9 Claims, 1 Drawing Sheet

(56) References Cited

U.S. PATENT DOCUMENTS

| | | | |
|---|---|---|---|
| 4,739,813 A * | 4/1988 | Pagani | 152/427 |
| 4,768,574 A * | 9/1988 | Probst | 152/415 |
| 4,836,235 A * | 6/1989 | Pagani | 137/223 |
| 5,816,284 A * | 10/1998 | Lin | 137/223 |
| 2002/0023676 A1* | 2/2002 | Reinhardt | 137/223 |
| 2003/0089874 A1* | 5/2003 | Hall et al. | 251/149.6 |
| 2005/0028865 A1* | 2/2005 | Nikolayev et al. | 137/223 |
| 2009/0255598 A1* | 10/2009 | Krug et al. | 137/614.05 |

OTHER PUBLICATIONS

International Search Report for International Application PCT/EP2011/052262 mailed Jun. 5, 2011.

English translation of Written Opinion of International Searching Authority.

* cited by examiner

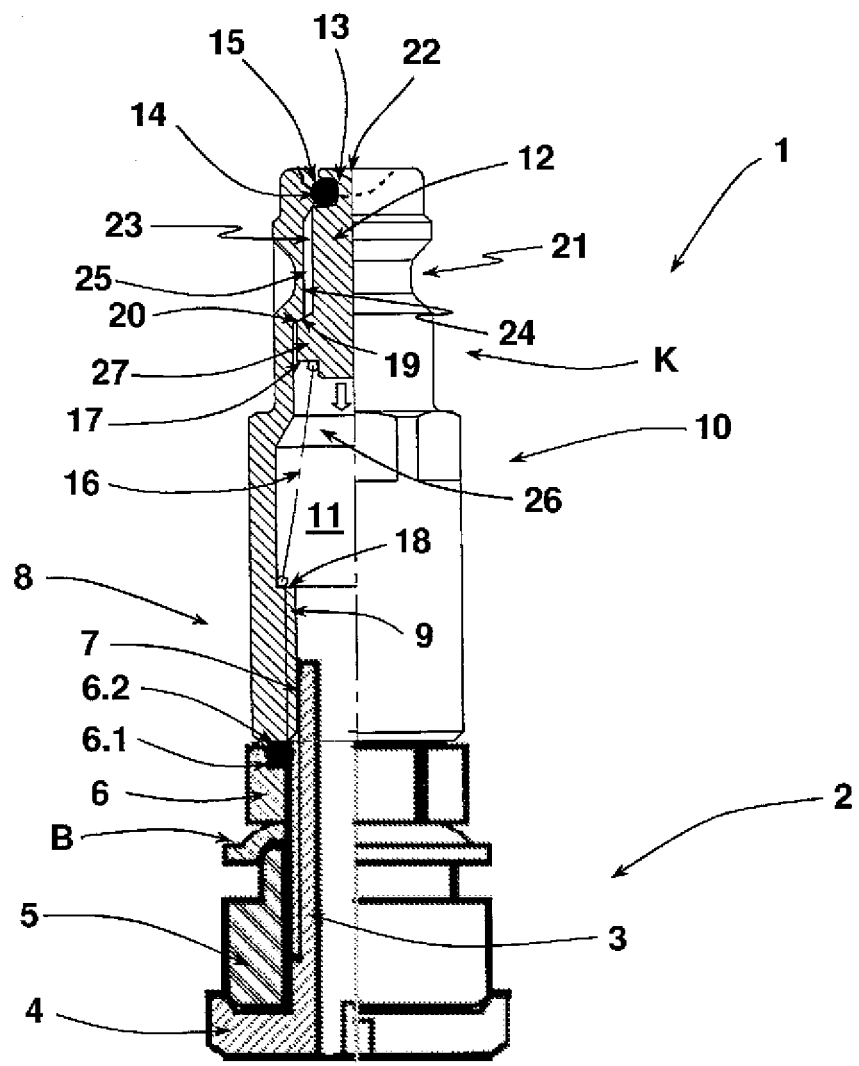

TIRE VALVE

CROSS REFERENCE APPLICATIONS

This application is a National Stage entry of PCT/EP2011/052262 filed Feb. 16, 2011 which claims priority from German application 20 2010 000 254.0 filed Feb. 24, 2010, which is hereby incorporated by reference for all purposes

BACKGROUND

Vehicle tire valves for are designed as either rim valves or as hose valves. Since motor vehicle tires are commonly tubeless, mostly rim valves are used with motor vehicle rims. Both types of valves have a valve base, which in the case of a rim valve is screwed on to seal it with the rim. The valve base comprises an annular cylindrical tube section with an outer threading. The outer threading can be subdivided into two sections, a threading section for securing the valve base on the rim and another threading section for screwing on a valve cap to close the valve. In addition, the tube has an inner threading to secure the actual valve. The valve has a valve body with an attachment means configured as an attachment threading for attaching the valve body to the outer threading on the valve base, by which this is screwed into the tube of the valve base. The valve body has a valve channel extending in the axial direction and has a valve seat for a valve part movable in the axial direction in the valve channel. In the closed setting the valve and its sealing surface act against the valve seat of the valve body. The valve part has a pin which projects out over the valve body in the area of the upper opening of the tube of the valve base. To release air from the tire he valve part is lifted away from the valve seat by compressing the pin into the valve body. If a clamp coupling is attached to the tube of the valve base the valve part is also lifted away from the valve seat when air is put in.

Although functioning of the prior art valve has proven itself, for some applications it would be desirable if the air pressure in a tire could be changed faster. This is especially true when letting air out. Such an application is needed for vehicles that are operated on varied surfaces. Occasionally it is necessary to lower the air pressure in a tire to increase the tire footprint when traveling over a soft surface. This customarily is done by pressing in on the pin assigned to the valve part of the tire valve, either manually or by attaching a manometer or a hose as part of a governing device on the vehicle side. A coupling piece is clamped onto the threaded end of the tube of the valve base ror attaching the manometer or hose. Part of the coupling is an operating pin which acts on the pin of the valve part to open the valve. The clamping should be done with care when the couplings are used for attaching a manometer or a house on a tire valve. Otherwise the clamp coupling, particularly at the higher air pressures, can pop off. Couplings that are screwed onto the outer threading of the tube to avoid this problem are viewed as troublesome to manipulate.

Based on this discussed prior art, therefore, it is desirable is to develop a tire valve that allows to not just let air out of a tire quickly with a coupling that can be securely attached, but also that a tire valve is suitable for smaller tires.

The foregoing example of the related art and limitations related therewith are intended to be illustrative and not exclusive. Other limitations of the related art will become apparent to those of skill in the art upon a reading of the specification and a study of the drawings.

SUMMARY

The invention relates to a tire valve having a valve channel with a valve body enclosing a valve seat. The valve has at least one connecting means for connecting the valve body to a valve base. The valve also has a valve part inserted in the valve channel that is movable in the axial direction therein, sealing the bearing against the valve seat of the valve body in the closed position of the valve.

In this valve, the attachment means, which typically is designed as an attachment threading, is not radially arranged around the necessary elements of the valve, like the valve seat and the movable valve part. Rather the attachment element is in a connecting segment is axially displaced relative to these elements. Thus the valve body with its valve-functioning elements is at a distance from the end of the tube of the valve base. The axial direction spatial separation between the connection segment and the functioning elements of the tire valve permit the functioning elements to be placed outside the tube of the valve base. This places them at a location is not limited in radial direction by the clear width of the tube of the valve base. Consequently, such a tire valve can have a valve channel of greater diameter and a valve part designed with a correspondingly larger diameter. The larger diameter of the valve channel results in a larger flow cross section with the valve open and thus quicker release of air from the tire as well as faster pumping of air into the tire. Due to the arrangement of the valve body with its functional elements outside the tube of the valve base, a configuration of the valve body that corresponds to the requirements, in fact independent of the otherwise present limitations of the tube of the valve base, is permitted. For example, the valve body can have an encircling clamping groove and/or other connection elements for attachment of the coupling of a hose or manometer. This allows the coupling to be attached in form-locking fashion onto the valve, without screwing the coupling piece onto a threading.

Additionally, the valve body of this tire valve is a single-piece design. The one-piece configuration of the valve body permits it to be produced with sparing use of materials but nonetheless meet the strength requirements set for the valve body. As a consequence of the sparing use of material, such a tire valve is relatively low in weight and therefore suitable for use on smaller tires, for example those for passenger cars. It is precisely with passenger vehicles, especially if they are capable of off-the-road travel like SUVs, that such tire valves can be used, even if the tires for such vehicles must endure higher rotational velocities than for example truck tire valves. The previously-described separation of the valve-functioning section and the attachment means section from each other in the axial direction permits a more slender configuration, which is a prerequisite for using as little material as possible and therefore as low a weight of the tire valve as possible.

The attaching means of the valve body is configured as a threading connection with an interior or exterior threading. If it is desired that the valve channel have as large a flow-through cross section as possible is desired, the threading connection of the valve body is designed as an interior threading. This allows the valve body to be screwed onto the outer threading of the tube of a valve base. Such a tire valve is then is screwed like a customary protective cap onto the tube of the valve base, and correspondingly extends it. The valve body with its attachment means is connected to the valve base in a sealed a manner. With use of an invention-specific tire valve the valve part can be designed to be shorter overall since the valve part does not need be accommodated into the tube of the valve base, at least not totally.

The relatively large structural area available within the valve channel allows there to be installed elements. For example, there could be a stop surface to limit the motion of the valve part in the closing direction. Correspondingly, the valve part has a complementary stop, with these stop surfaces preferably configured as encircling radial projections. The stops may be inclined in the direction of the longitudinal axis and to the valve opening. By providing such a stop on the valve seat in the closed setting of the tire valve, if the gasket adjoins the valve seat as part of the valve part, the elastomer gasket is at maximum only as severely deformed as is possible via the previously described motion stop, before the two stop surfaces adjoin one another. This measure causes the sealing element to be gently used. This is understood to mean that the effect occurs not only if the sealing element is part of the movable valve part, but also if a used sealing element is assigned to the valve body fixed relative to the valve part.

The following embodiments and aspects thereof are described and illustrated in conjunction with systems, tool and methods which are meant to be exemplary and illustrative, not limiting in scope. In various embodiments, one or more of the above described problems have been reduced or eliminated, while other embodiments are directed to other improvements.

In addition to the exemplary aspects and embodiments described above, further aspects and embodiments will become apparent by reference to the accompanying drawings forming a part of this specification wherein like reference characters designate corresponding parts in the several views.

BRIEF DESCRIPTION OF THE DRAWINGS

FIG. 1 is a partial longitudinal section through a tire valve.

Before explaining the disclosed embodiment of the present invention in detail, it is to be understood that the invention is not limited in its application to the details of the particular arrangement shown, since the invention is capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION OF THE DRAWINGS

FIG. 1 is a partial longitudinal section through a tire valve 1, which, in the depicted embodiment is attached to a valve base 2 for mounting on a vehicle rim. The valve base 2 has a tube 3 with a longitudinal channel, a connection flange 4, a shoulder seal 5 and a mounting nut 6 to brace the valve base 2 to the rim bed of a vehicle tire while inserting a valve shim B. The tube 3 has an exterior threading 7 on the end opposite the attachment flange 4. The channel formed by the tube 3 creates a pathway between the interior of a tire mounted on a rim and the surroundings. The mounting nut 6 is designed as a groove nut, and has an annular surrounding recess 6.1, into which an O-ring 6.2 made of an elastomeric material is inserted. The diameter of the O-ring 6.2 is dimensioned such that in its de-tensioned state in the axial direction it projects over the surface of mounting nut 6 pointing away from valve shim B.

The tire valve 1 has an attachment section 8 with an interior threading 9 complementary to the outer threading 7 of tube 3 as an attachment means for attaching tire valve 1 to valve base 2. Tire valve 1 is screwed onto the tube 3 with inner threading 9. The attachment section 8 of tire valve 1 is a part of the valve body 10 of tire valve 1. Adjoining the attachment section 8 of valve body 10 is a coupling section with the functional elements of tire valve 1. Valve body 10 is manufactured as a single piece, typically as part of a machining step. Valve body 10 encloses a valve channel 11 within its coupling section K as a continuation of the channel enclosing from tube 3 of valve base 2. A valve part 12 movable in the longitudinal-axis direction is placed in the valve channel 11 of valve body 10. Valve part 12 is in the closed setting in FIG. 1. The opening motion of valve part 12 is indicated by a solid arrow. Valve part 12 carries a gasket 14 in a groove 13 on its end area pointing away from attachment section 8. In the depicted embodiment the gasket 14 is designed as an O ring made of an elastomer material. In its closed setting the gasket 14 seals as it adjoins on a valve seat 15 made available by a valve 10. As depicted in FIG. 1, valve part 12 is held in the closed position by the force of a compression spring 16. Compression spring 16 is designed as a conical spring and its tapered end is braced on a spring seat designed as a step 17 pointing to the attachment section 8 of valve part 12, and with its other end it braces on a step 18 provided on an inner threading 9 at the valve-body end as a spring seat on the valve-body side.

The valve body 10 has an encircling stop surface 19 inclined in the direction of the longitudinal axis of tire valve 1 and in the direction toward valve seat 15. The valve part 12 has a complimentarily designed stop surface 20. In the closed setting of valve part 12, the two stop surfaces 19, 20 adjoin each other. This limits the mobility of valve part 12 in the closing direction, with the result that gasket 14 is deformed independent of the pressure prevailing in the tire with a defined pre-stressing to create the sealing. Additionally, the prestressing of the spring ensures that the tire valve 1 is closed if the tire has no pressure.

Valve body 10 has an outer encircling groove 21 in the free end area of its coupling section K. The groove 21 serves as an attachment or cramping groove for a coupling piece to be attached to tire valve 1, such as a manometer or a hose of a tire pressure regulating device. A clamping element of the coupling piece engages into groove 21, through which it can be attached in form-locked fashion to tire valve 1. In the same way, tire valve 1 can be closed by a cap secured in groove 21.

Valve part 12 has a recess 22 on its head side pointing outwards, which is designed in the depicted embodiment as a hollow-shaped recess 22. The recess 22 allows a control element for a coupling to be attached onto tire valve 1, through which valve part 12 is moved out of its closed setting shown in FIG. 1 in the direction toward attachment section 8 against the force of compression spring 16 for opening tire valve 1.

There is an annular gap 25 between the outer jacket surface 23 of valve part 12 and the inner jacket surface 24 of valve body 10. Traditional tire valves which are screwed into the inner threading of the tube of a valve base, have a cross-sectional width in the clear through which fluid can flow of about 0.5 mm. However, the flow-through diameter with the tire valve 1 depicted in the figure is 3.5 to 4 mm. This is achieved by the relatively large size of the annular gap 25 and by the placement of same at a relatively large distance to the longitudinal axis of valve 1 (compared to valves previously known), by which the width of annular gap 25 is greater and thus the flow-through surface is correspondingly larger.

The conicity of the compression spring 16 also ensures a guiding of valve part 12, if it is moved in the direction of the attachment section 8 for opening of tire valve 1. Valve part 12 is in its completely open setting when stop surface 20 is in an axial position below another step 26 of valve body 10. Then the flange 27 of valve part 12 forms the stop surface 20 and the step 17 for the spring seat is at a distance to step 26, so that also in volume terms relative to flange 27 a sufficiently large flow-through surface is made available. If the valve part 12 is only to be slightly lifted from valve seat 15 for opening, and thus for putting air into a tire and removing it, the flange 27 may have openings such that it is formed by individual flange segments situated at intervals from each other via openings.

The diameter of the valve body 12 in the section of valve channel 11 adjoining the stop surface 19 up to the inclined step 26, and thus that section of valve channel 11 in which the flange 27 is movable in the axial direction, corresponds to the inner diameter of valve body 10 in the area of its inner threading 9. Thus the valve part 12, the largest diameter of which is defined by the flange 27, is readily inserted through the opening of valve body 10 made available by the inner threading 9. The compression spring 16 is then also inserted through this opening into the valve body 10 until with its largest-diameter end winding it comes to rest on stop 18. With the depicted embodiment, the determination of the diameter of flange 27 of valve part 10 to the diameter of inner threading 9, wherein the latter needs only to be dimensioned with a certain play for insertion of valve part 12, to be larger than the diameter of flange 27, ensures that only a small amount of material is necessary to produce the valve body 10. This allows the valve body 10 to be kept slender. Thus its outer diameter ultimately needs to have a material thickness that suffices to satisfy the mechanical requirements and the production requirements.

With the valve body 10 that is screwed on the tube 3, the O ring 6.2 serves as a seal vis-à-vis the valve body 10.

The invention was described using an embodiment example which exhibited an attachment threading as the means for attaching the tire valve to a valve base. Other devices can also serve as attachment means, especially if the valve base is adapted to it. For example, the tire valve can also be attached to the valve base using a bayonet lock. Likewise, other attachment means can be implemented for attaching the tire valve to the outer threading of a cylindrical base, for example by means of a clamp.

LIST OF REFERENCE SYMBOLS

1 tire valve
2 valve base
3 tube
4 attachment flange
5 shoulder seal
mounting nut
6.1 recess
6.2 O ring
7 outer threading
8 attachment section
9 inner threading
10 valve body
11 valve channel
12 valve part
13 groove
14 gasket
15 valve seat
16 compression spring
17 step
18 step
19 stop surface
20 stop surface
21 receptacle
22 receptacle
23 jacket surface
24 jacket surface
25 annular gap
26 step
27 flange
B valve shim
K coupling section

The invention claimed is:

1. A tire valve comprising:
   a valve body with a valve channel extending through,
   the valve channel having a valve seat;
   the valve body having at least one attachment means for attaching of the valve body to a valve base;
   the valve further comprising a valve part inserted in the valve channel, said valve part being movable as a unified piece in the axial direction in the valve channel;
   the valve part carries a gasket which adjoins in sealing fashion the valve seat of the valve body when the valve is in a closed position, wherein the gasket is pressed against the valve seat by the valve part;
   the attachment means of the valve body being in an attachment section axially spaced from a valve-functional section of the valve body;
   the valve body is formed as a single piece;
   wherein the valve part is held by a compression spring against the valve seat and wherein the valve is opened by moving the valve part against the force of the compression spring;
   the valve body having a step projecting outwards in a radial direction on the inner side, said step functioning as valve-body-side spring seat;
   the valve body having a stop surface projecting inwards in the radial direction and the valve part having a flange formed of the same material as the rest of the valve part projecting outwards in radial direction having a complementary outward projection stop surface facing into the direction of the valve seat and having a step facing towards the compressing spring functioning as valve-part-side spring seat, whereas the two stop surfaces functioning to limit the mobility of the valve part in the valve body in the direction of the valve seat;
   wherein the two stop surfaces, when in contact with each other, limit the movement of the valve part in the valve body in its closed position, whereby the gasket is deformed with a defined pre-stressing, the stop surfaces being arranged spaced apart in the axial direction from the valve seat; and
   an annular yap being formed between the stop surfaces and the valve seat and between an outer jacket surface of the valve part and an inner jacket surface of the valve body.

2. The tire valve according to claim 1, wherein the attachment means is designed as an attachment threading.

3. The tire valve according to claim 2, wherein the attachment threading of the valve body is an interior threading adapted for screwing onto an exterior threading of the valve base.

4. The tire valve according to claim 3, wherein the attachment section with its interior threading is a part of the valve body having a cylindrical jacket surface.

5. The tire valve according to claim 4, wherein the attachment section of the valve body has a coupling section with a locking contour for attachment of a coupling piece such as a manometer or a hose of a tire pressure regulator or a protective cap.

6. The tire valve of claim 1, wherein the stop surfaces are inclined toward a valve opening as well as of the longitudinal axis of the valve body.

7. The tire valve of claim 1, wherein the stop surfaces are arranged in relation to the geometry of a gasket and the valve seat such that they adjoin to limit deformation of the gasket.

8. The tire valve of claim 1, wherein the stop surfaces are arranged in relation to the geometry of gasket and valve seat such that they adjoin to limit deformation of the gasket.

9. The tire valve of claim 1 wherein the valve part on its end pointing away from the attachment section has a recess to accommodate a control element belonging to a coupling for attaching onto the valve for opening the valve.

* * * * *